United States Patent
Boudreaux

(10) Patent No.: US 9,803,785 B1
(45) Date of Patent: Oct. 31, 2017

(54) DISC BRAKE LOCK SWIVEL

(76) Inventor: Raleigh Boudreaux, Broussard, LA (US)

(*) Notice: Subject to any disclaimer, the term of this patent is extended or adjusted under 35 U.S.C. 154(b) by 1568 days.

(21) Appl. No.: 13/197,921

(22) Filed: Aug. 4, 2011

Related U.S. Application Data

(60) Provisional application No. 61/370,605, filed on Aug. 4, 2010.

(51) Int. Cl.
*F16L 27/08* (2006.01)

(52) U.S. Cl.
CPC ................. *F16L 27/0808* (2013.01)

(58) Field of Classification Search
CPC ................................... F16L 27/0808
USPC ....... 285/100–101, 272, 275, 282, 280, 278; 188/71.5, 72.4, 73.2
See application file for complete search history.

(56) References Cited

U.S. PATENT DOCUMENTS

| | | | |
|---|---|---|---|
| 1,566,569 A * | 12/1925 | Anderson | 188/71.5 |
| 2,020,667 A * | 11/1935 | Wahl | 188/18 A |
| 2,218,616 A * | 10/1940 | McCune et al. | 188/153 R |
| 3,357,528 A | 12/1967 | Verlinde | |
| 3,598,188 A * | 8/1971 | Foster | E21B 3/04 173/165 |
| 4,037,694 A * | 7/1977 | Keese | 192/221.1 |
| 5,996,712 A | 12/1999 | Boyd | |
| 6,059,050 A * | 5/2000 | Gray | E21B 7/068 188/180 |
| 6,145,635 A * | 11/2000 | White | 188/170 |
| 6,244,345 B1 | 6/2001 | Helms | |
| 6,405,837 B1 * | 6/2002 | Muramoto | 188/72.5 |
| 6,994,628 B2 | 2/2006 | Boyd | |
| 7,320,374 B2 * | 1/2008 | Folk | E21B 19/02 175/162 |
| 7,481,282 B2 * | 1/2009 | Horst | E21B 7/067 175/75 |
| 7,712,523 B2 * | 5/2010 | Snider | E21B 19/07 166/250.01 |
| RE41,759 E | 9/2010 | Helms | |
| 8,322,461 B2 * | 12/2012 | Hay | E21B 47/024 175/45 |
| 9,388,635 B2 * | 7/2016 | Schroter | E21B 47/024 |

* cited by examiner

*Primary Examiner* — David E Bochna
(74) *Attorney, Agent, or Firm* — Tenley Krueger; Baker Botts L.L.P.

(57) ABSTRACT

A lockable disc brake swivel for use in a drill string is comprised of a tubular swivel housing having a rotatably mounted swivel stem. A disc brake housing is mounted to the swivel housing to encase a radially extending brake disc engaged for rotation with the swivel stem. The disc brake housing also has a disc brake surface that may be selectively engaged with the brake disc to allow or prevent rotation of the swivel stem. The brake piston may be hydraulically or pneumatically activated.

14 Claims, 5 Drawing Sheets

DISC BRAKE LOCK SWIVEL

PRIORITY

This application claims priority to U.S. provisional application entitled "Disc Brake Lock Swivel" bearing Ser. No. 61/370,605 filed Aug. 4, 2010, the entire content of which is hereby incorporated by reference.

FIELD OF INVENTION

The present invention generally relates to a lockable swivel apparatus for use in oil and gas well drilling and production operations, and more particularly to a swivel having a disc brake assembly for arresting or allowing rotation and thereby locking and unlocking the swivel.

BACKGROUND

Locking swivel devices are used during wireline operations and other aspects of drilling oil and gas wells to allow an operator to engage and disengage the drill string from rotation. The proposed device provides an inline swivel having a disc brake mechanism for arresting or allowing swivel rotation to engage and disengage the drill string from rotation.

SUMMARY OF THE INVENTION

The present invention provides a locking swivel apparatus. The apparatus is comprised of a swivel stem, a swivel assembly for retaining the swivel stem, and a disc brake assembly mounted to the swivel stem assembly. The swivel assembly is comprised of a swivel top sub, a swivel bearing, and a swivel nut that retains the swivel bearing within the swivel top sub. The disc brake assembly is comprised of a rotor disc mounted to the swivel stem, a brake housing having a pneumatic or hydraulic actuated brake piston which when activated engages the rotor disc to lock the swivel stem to the swivel nut and thus preventing rotation of the swivel stem. The proposed apparatus provides a smoother and more efficient breaking system over the system typically employed for locking swivels. It also reduces the costs associated with the manufacture and maintenance in comparison with other types of brake swivels.

DESCRIPTION OF THE EMBODIMENT

Figure 1:
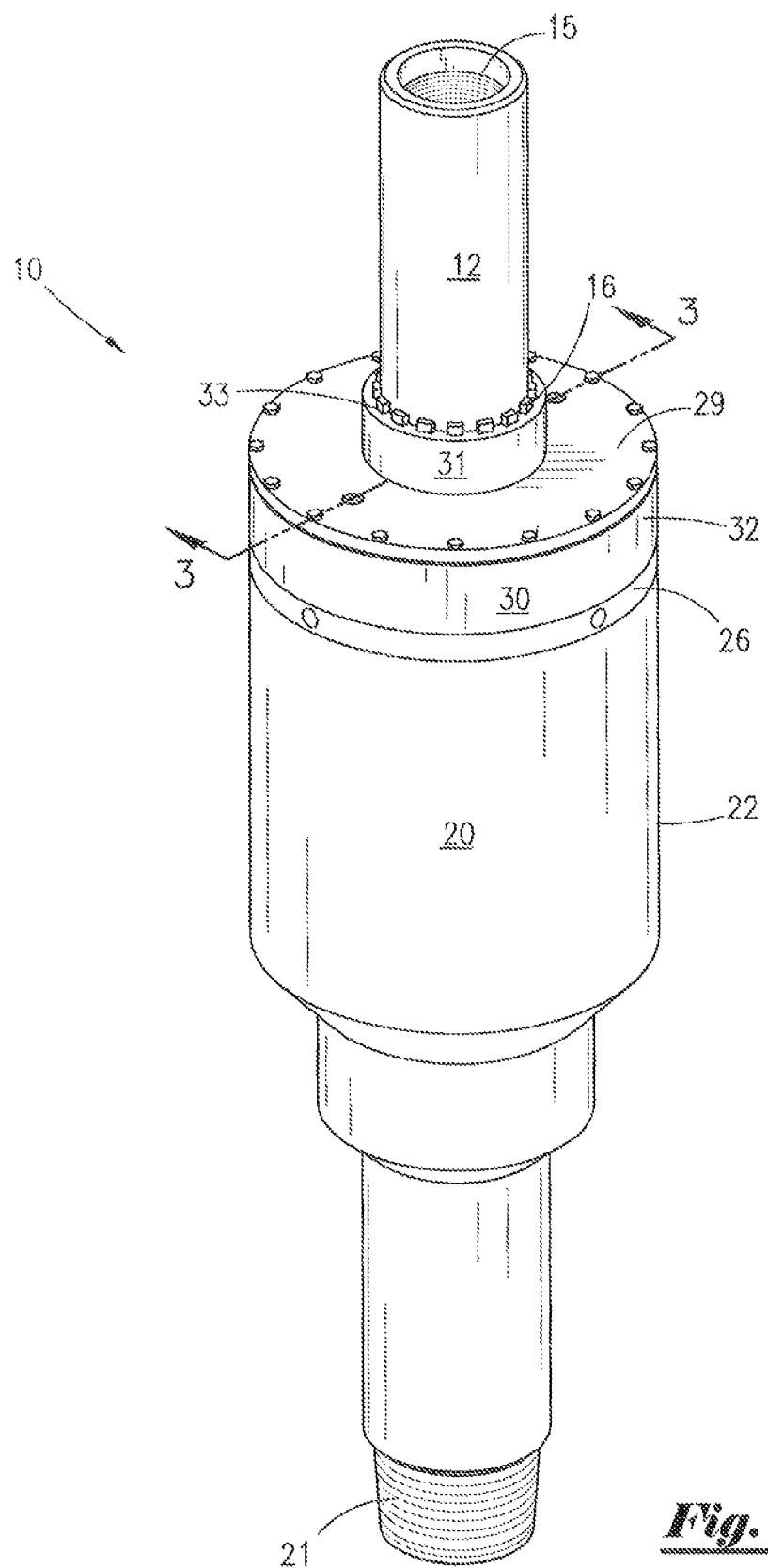
FIG. 1 is a longitudinal perspective view of one exemplary embodiment of the disc brake locking swivel apparatus of the present invention.
Figure 2:
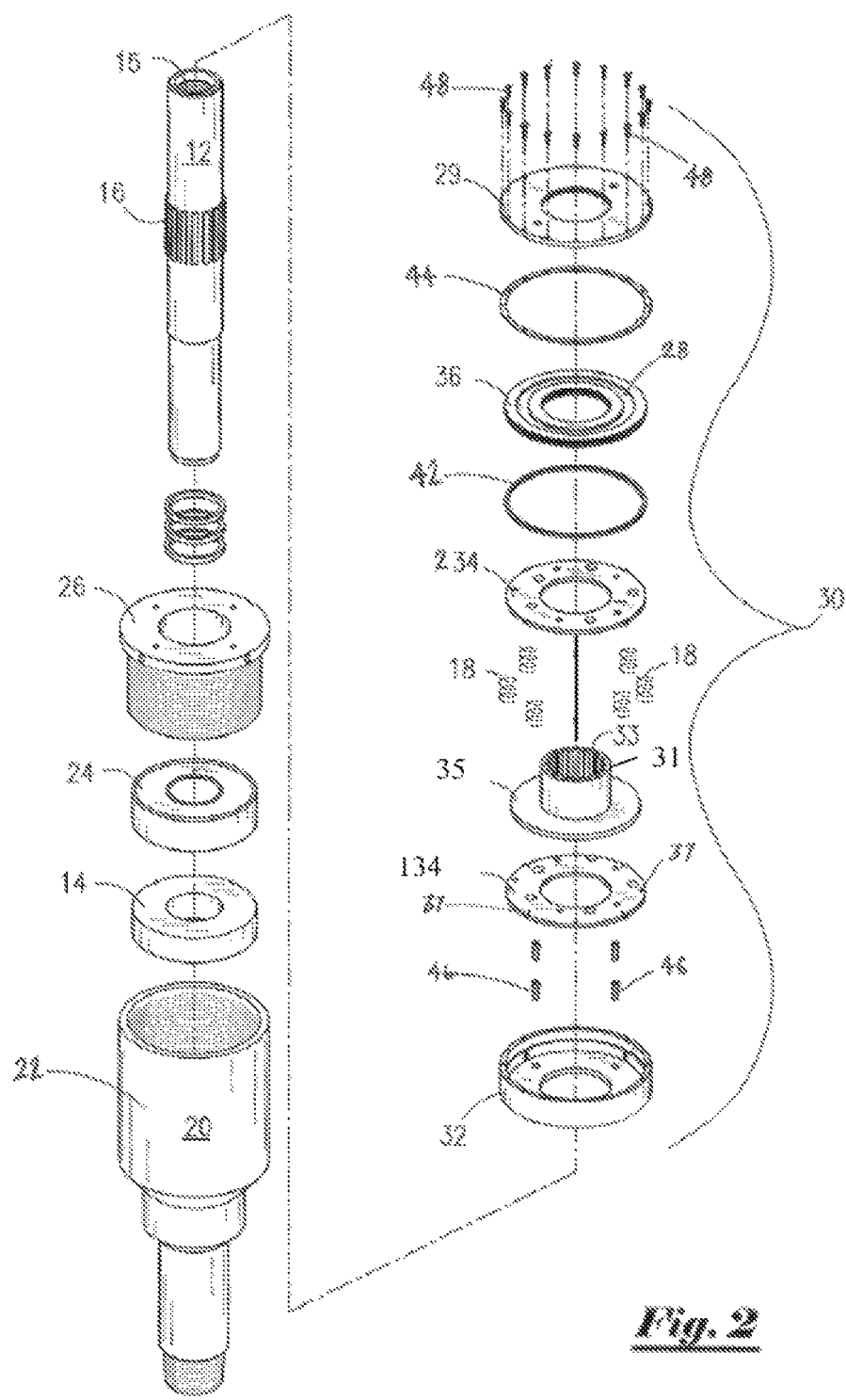
FIG. 2 is an exploded longitudinal perspective view of the disc brake locking swivel apparatus shown in FIG. 1.
Figure 3:
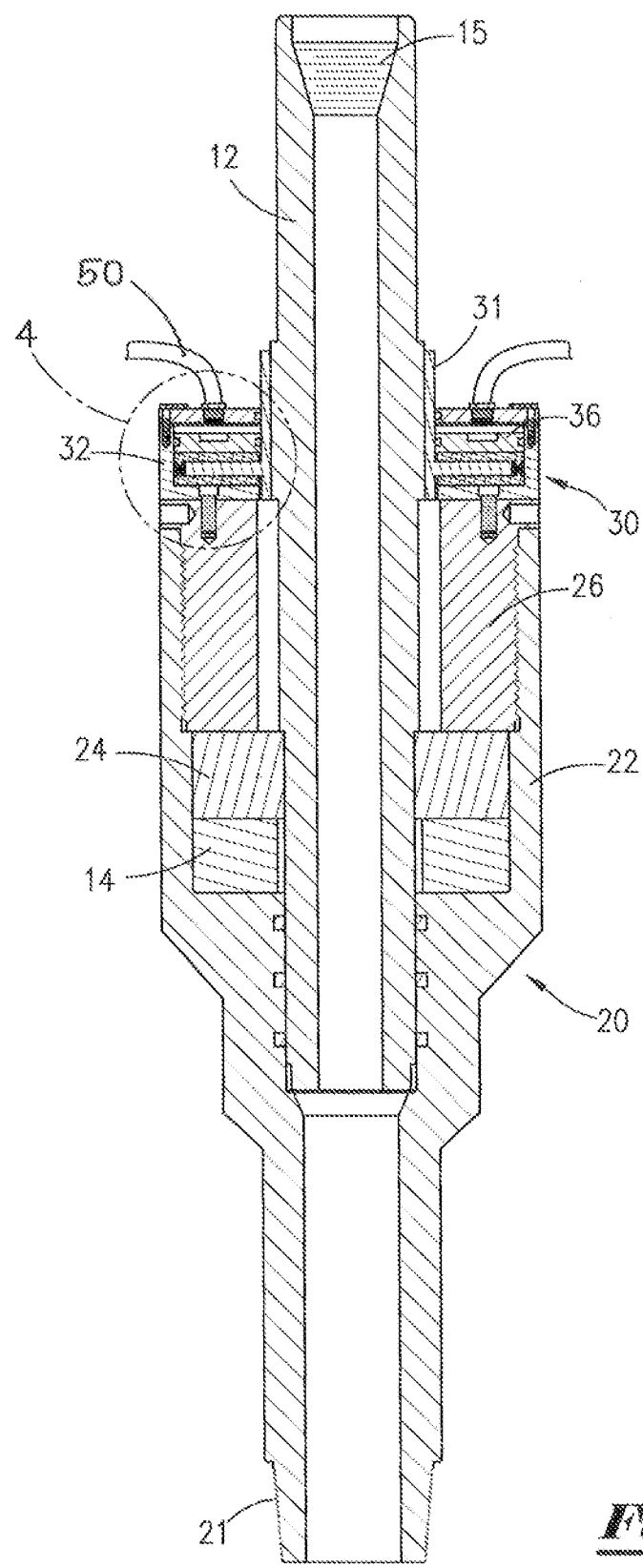
FIG. 3 is a longitudinal cross-section view of the disc brake locking swivel apparatus shown in FIG. 1.

Referring now to the FIG. 1 through FIG. 3, a perspective view of the disc brake locking swivel apparatus (10) is shown. The swivel apparatus (10) is comprised of a longitudinally extending swivel stem (12), a swivel housing assembly (20) that rotatably retains the swivel stem (12), and a disc brake assembly (30) mounted to the swivel housing assembly (20).

The swivel housing assembly (20) is comprised of a generally tubular longitudinally extending swivel top sub (22), a swivel bearing (24), and a swivel nut (26). The generally tubular swivel top sub (22) receives and rotatably retains the swivel stem (12) by means of swivel bearing flange (14) that extends radially outward from the swivel stem (12), the swivel bearing (24) and the swivel nut (26). As shown, the swivel bearing (24) is held between the swivel bearing flange (14) and the swivel nut (26) by threadable engagement of the swivel nut (26) within the swivel top sub (22).

The disc brake assembly (30) is comprised of a brake housing (32) and a removable brake housing cap (29), each having a central opening configured to receive the swivel stem (12). A lower brake disc (134), having a brake surface (38), is mounted to the brake housing (32) around the central swivel stem opening by means of screws, bolts or other suitable mounting means. Within the brake housing (32) is a centrally positioned and rotatably mounted brake hub (31) that has a radially extending brake disc (35). The brake hub (31) is configured to receive and engage with the swivel stem (12) by means of a plurality of splines (16) and grooves (33). The radially extending and longitudinally oriented splines (16) on the swivel stem (12) mate with corresponding grooves (33) on the interior of the brake hub (31) in order to rotate brake hub (31) and corresponding brake disc (35) with the rotation of the swivel stem (12).

The brake housing (32) also houses an extendable and retractable brake piston (36) that extends radially around a central opening configured to receive the swivel stem (12). An upper brake disc (234), having a brake surface (38), is mounted to the brake piston (36) around its central swivel stem opening by means of screws, bolts or other suitable mounting means. The brake surface (38) on both brake disc (134) and (234) brake disc is a durable braking surface, which may be configured as a replaceable shoe or pad, for arresting the rotation of the brake disc (35) of the brake hub (31) upon contact.

Figure 4:
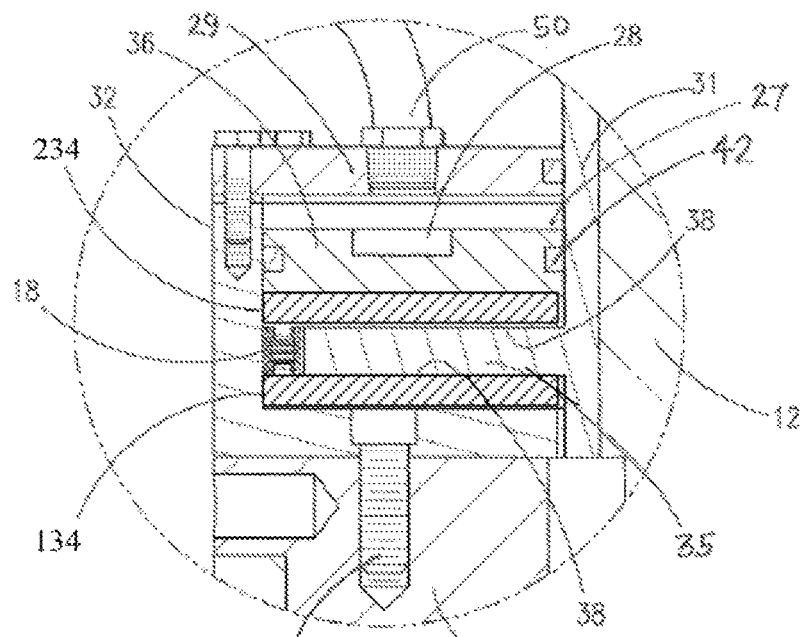
FIG. 4 is a detail partial cross-section view of the disc brake assembly engaged to prevent swivel rotation.
Figure 5:
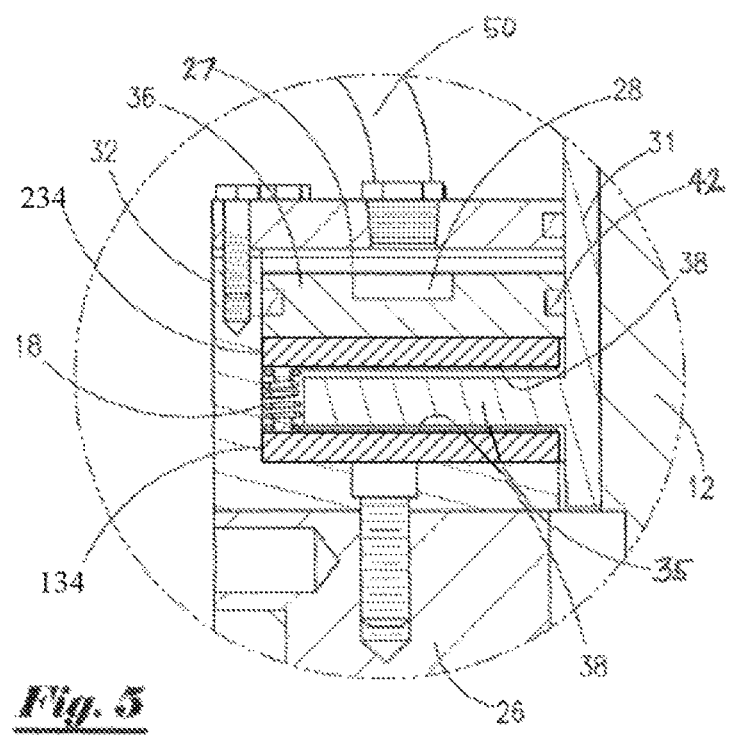
FIG. 5 is a detail partial cross-section view of the disc brake assembly disengaged to allow swivel rotation.

As shown in FIGS. 4 and 5, the brake disc (35) on brake hub (31) is sandwiched between the upper brake disc (234) on the brake piston (36) and the lower brake disc (134) on the brake housing (32). Coil springs (18) on retaining post (37), or other biasing means such as leaf springs, disc springs or Belleville washers, serve to provide resistance to separate the upper brake disc (34) from the lower brake disc (34). The engagement of the swivel stem (12) with the brake hub (31) by splines (16) and grooves (33) will transfer to the radially extending brake disc (35). The brake piston (36) has groove (28) to create or enhance a pressure chamber (27) between the brake piston (36) and the brake housing cap plate (29). Upon engagement of the brake piston (36) in response to hydraulic or fluid pressure in the pressure chamber between the brake piston (36) and the brake housing cap plate (29), the resistance of the springs (18) will be overcome and the brake surfaces (38) of brake disc (134) and (234) will engage the brake disc (35) on brake hub (31) and thereby locking the swivel-stem (12).

The brake piston (36) is actuated to selectively engage and disengage the disc brake surface (38) with the brake disc (35) of the brake hub (31), as shown in FIG. 4 and FIG. 5, respectively, by pressure changes in pressure chamber (27) between the brake piston (36) and the brake housing cap plate (29). This pressure is provided by means of power lines generally designated as (50) comprised of a series of hydraulic or pneumatic lines, cylinders, pistons, springs and valves, and ports that may be fitted to the brake housing (32) of the swivel apparatus (10). Resilient seals (42) and gaskets (44) serve to maintain the desired pressure within the brake housing (32).

As seen in FIG. 3, the disc brake locking swivel apparatus (10) may be assembled by inserting the swivel bearing flange (14) and the swivel bearing (24) within the swivel top sub (22) and locking them in place with the swivel nut (26). The swivel stem (12) is then inserted into the top sub (26) through the swivel nut (26). The brake housing (32) is then bolted to the swivel nut (26) by bolts (46). The lower brake disc (134) is then attached to the brake housing (32). The hub (31) is then placed onto the swivel stem (12) by engagement of the swivel splines (16) of the swivel stem (12) to mate with the corresponding grooves (33) on the interior of the brake hub (31). The brake piston (36) is fitted with the upper brake disc (234).

Once the hub (31) is in place, a plurality of springs (18) are placed around the swivel stem (12) onto the spring retaining posts (37) and are mated with spring retaining posts (37) on the brake piston (36) with the attached upper brake disc (234). The brake housing cap (29) is attached to the brake housing (32) by means of cap bolts (48) to seal the disc brake assembly (30). The power lines (50) are then attached.

Figure 6:
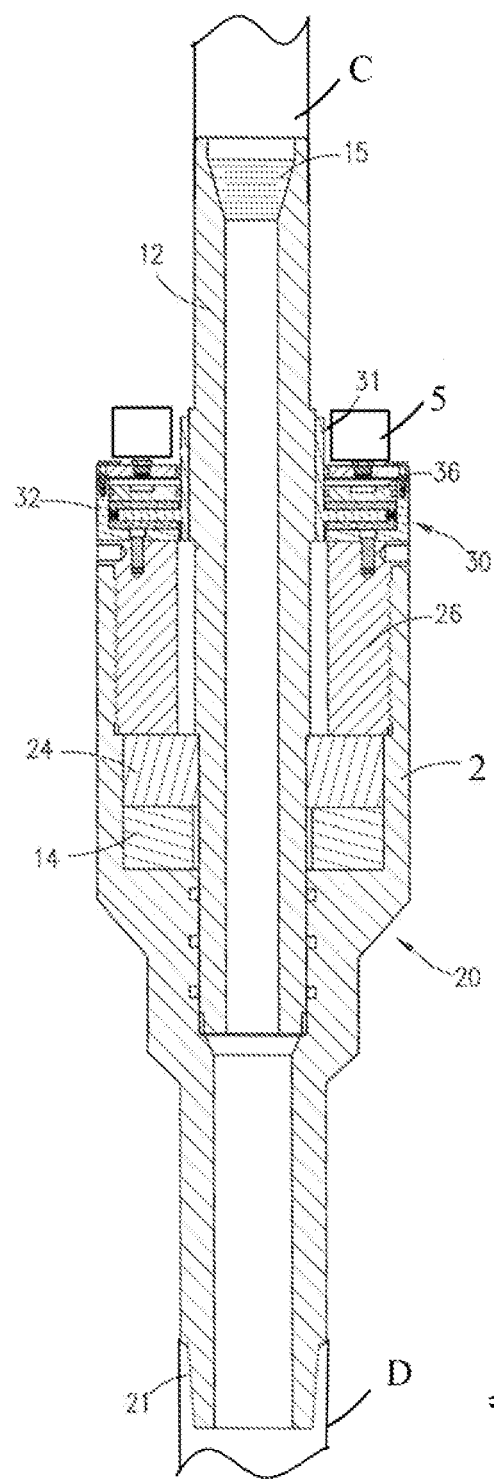
FIG. 6 is a longitudinal cross-section view of the disc brake locking swivel apparatus attached to pipe segments or other equipment components such as a drill string, a top drive unit, or a coil tubing unit.

As an alternative to using a hydraulically or pneumatically activated brake piston (36), the brake assembly (30) may be provided with an electric disc brake utilizing an electromagnet (51) as shown in FIG. 6, along with associated electrical wiring, connections and switches, to engage the disc brake surface (38) of the brake disc (134) and (234) with the brake disc (35) of the brake hub (31) to prevent rotation of the swivel stem (12).

As shown in FIG. 6, the swivel stem (12) has a connection end (15) and the swivel sub (22) of the swivel housing assembly (20) has a connection end (21). These connection ends (15) and (21) allow connection of the swivel assembly (10) to desired pipe segments (C) and (D) or other equipment components such as a drill string, a top drive unit, or a coil tubing unit. The connection ends (15) and (21) may be threaded connections of the type typically used for connection to a drill string, a top drive unit, or a coil tubing unit or any desired type of pipe connection. Use of the disc brake locking swivel apparatus (10) will provide for a variety of applications in the drilling and production of oil and gas.

The fitting and details of the hydraulic or pneumatic components of the apparatus (10) such as fluid lines, air lines, valves, cylinders, pistons, gaskets, and springs as well as any alternative electrical brake components such as electromagnets, switches, connections and wiring are generally known and are generally omitted from the drawings in the interest of descriptive clarity. Other features omitted from the drawings for clarity may include threaded junctures, weld lines, sealing elements, pins and welded or brazed junctures.

It is thought that the brake lock swivel described herein and many of its advantages will be understood from the foregoing description. One skilled in the art will appreciate that the brake lock swivel invention presented herein can be practiced by other than the described embodiments, which are presented solely for the purposes of illustration and not for limitation.

What is claimed is:
1. A lockable swivel comprising:
(a) a tubular swivel housing, said housing providing attachment for a pipe segment;
(b) a swivel stem rotatably mounted within said swivel housing, said swivel stem providing attachment for a pipe segment;
(c) a brake hub having a radially extending brake disc, said brake hub engaged for rotation with said swivel stem;
(d) a disc brake housing mounted to said swivel housing, said disc brake housing encasing said brake disc;
(e) an extendable and retractable brake piston having a disc brake surface mounted within said brake housing;
(f) means for extending and retracting said brake piston for selective engagement of said disc brake surface with said brake disc to prevent or allow rotation of said swivel stem within said housing; and
(g) a plurality of splines extending radially around said swivel stem; and
(h) a centrally located brake hub on said brake disc, said brake hub rotatably mounted within said disc brake housing, said brake hub configured with a plurality of grooves for receiving said splines of said swivel stem, whereby said swivel stem, said brake hub, and said disc brake are engaged for rotation.

2. The lockable swivel as recited in claim 1 wherein said means for extending and retracting said brake piston for selective engagement of said disc brake surface with said brake disc includes a hydraulically activated brake piston.

3. The lockable swivel as recited in claim 1 wherein said means for extending and retracting said brake piston for selective engagement of said disc brake surface with said brake disc includes a pneumatically activated brake piston.

4. The lockable swivel as recited in claim 1 wherein said swivel housing is provided with a threaded connection for connection to a drill string.

5. The lockable swivel as recited in claim 1 wherein said swivel stem is provided with a threaded end connection for connection to desired equipment.

6. A lockable swivel comprising:
(a) a swivel housing, said housing comprised of a tubular longitudinally extending swivel top sub, said swivel top sub having a threaded end for threadable engagement of said swivel top sub with a first pipe segment;
(b) a longitudinally extending swivel stem positioned within said swivel top sub, said swivel stem having a radially extending swivel bearing flange and a plurality of radially extending and longitudinally oriented splines, said swivel stem having a threaded end for threadable engagement of said swivel stem with a second pipe segment;
(c) a swivel bearing positioned within said swivel top sub against said swivel bearing flange;
(d) a swivel nut mounted on said swivel stem and threadably connected within said swivel top sub whereby said swivel stem is rotatably mounted within said swivel top sub,
(e) a disc brake assembly mounted to said swivel top sub, said disc brake assembly comprising a disc brake housing, a centrally located disc brake hub rotatably mounted within said disc brake said housing, said disc brake hub having a radially extending brake disc, said brake hub configured with a plurality of grooves for receiving said splines of said swivel stem, whereby said swivel stem, said brake hub, and said disc brake are engaged for rotation, and an extendable and retractable brake piston having a disc brake surface mounted within said brake housing; and (f) means for extending and retracting said brake piston for selective engagement of said disc brake surface with said brake disc.

7. The lockable swivel as recited in claim 6 wherein said means for extending and retracting said brake piston for selective engagement of said disc brake surface with said brake disc includes a pneumatically activated brake piston.

8. The lockable swivel as recited in claim 6 wherein said means for extending and retracting said brake piston for selective engagement of said disc brake surface with said brake disc includes a hydraulically activated brake piston.

9. The lockable swivel as recited in claim 6 wherein said second pipe segment is connected to a drill string.

10. In a drill string, a lockable swivel comprising:
   (a) a tubular swivel housing, said housing attachable to a pipe segment of a drill string;
   (b) a swivel stem rotatably mounted within said tubular swivel housing, said swivel stem attachable to a pipe segment of a drill string;
   (c) a brake hub having a radially extending brake disc, said brake hub engaged for rotation with said swivel stem;
   (d) a selectively extendable and retractable brake assembly having a disc brake surface mounted for selective engagement with said brake disc whereby extension and retraction of said disc brake surface will arrest or allow rotation of said swivel stem;
   (e) a plurality of splines on said swivel stem; and
   (f) a plurality of grooves on the interior of said brake hub engaged with said splines on said swivel stem whereby said swivel stem and said brake hub with said radially extending disc brake are engaged for rotation.

11. The lockable swivel as recited in claim 10 wherein said swivel housing and said swivel stem are provided with threaded connection ends.

12. The lockable swivel as recited in claim 11 wherein the brake assembly comprises a hydraulic piston that selectively extends and retracts the brake surface.

13. The lockable swivel as recited in claim 11 wherein said disc brake surface is selectively extended and retracted by means of a pneumatic piston.

14. The lockable swivel as recited in claim 11 wherein the brake assembly comprises an electromagnet that selectively extends and retracts the brake surface.

* * * * *